(12) United States Patent
Bill

(10) Patent No.: US 12,350,979 B2
(45) Date of Patent: Jul. 8, 2025

(54) TYRE MONITORING DEVICE CONFIGURATION

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 18/386,171

(22) Filed: Nov. 1, 2023

(65) Prior Publication Data

US 2024/0059108 A1  Feb. 22, 2024

Related U.S. Application Data

(63) Continuation of application No. 17/418,107, filed as application No. PCT/EP2020/066539 on Jun. 16, 2020, now abandoned.

(30) Foreign Application Priority Data

Jun. 17, 2019 (GB) .................................... 1908626

(51) Int. Cl.
  *B60C 23/04* (2006.01)
(52) U.S. Cl.
  CPC ...... *B60C 23/0454* (2013.01); *B60C 23/0471* (2013.01); *B60C 23/0479* (2013.01); *B60C 2200/02* (2013.01)
(58) Field of Classification Search
  CPC ............ B60C 23/0454; B60C 23/0471; B60C 23/0479; B60C 2200/02; B60C 23/0442; B60C 23/0472; B60C 23/0416; B60C 23/045; B60C 23/0461; B60C 23/0481

USPC ........................................................ 340/442
See application file for complete search history.

(56) References Cited

U.S. PATENT DOCUMENTS

| | | | |
|---|---|---|---|
| 7,202,777 B2* | 4/2007 | Tsuji .................. | B60C 23/0442 340/447 |
| 10,384,496 B1 | 8/2019 | Scheibenzuber | |
| 11,279,183 B2 | 3/2022 | Bout | |
| 2002/0126005 A1* | 9/2002 | Hardman ............ | B60C 23/0442 340/447 |

(Continued)

FOREIGN PATENT DOCUMENTS

| | | |
|---|---|---|
| CN | 103587357 | 2/2014 |
| CN | 105899378 A | 8/2016 |

(Continued)

OTHER PUBLICATIONS

European patent application 24166761.7-1009/4382321, Extended European Search Report (Aug. 8, 2024)(8 pages).

(Continued)

*Primary Examiner* — Eric Blount
(74) *Attorney, Agent, or Firm* — Nixon & Vanderhye P.C.

(57) ABSTRACT

A method of configuring a tire monitoring device including, at the tire monitoring device: entering a configuration mode; responsive to entering the configuration mode, transmitting a first message to a second device, the message indicating that the second device should transmit configuration data to the tire monitoring device; receiving configuration data from the second device in response to the first message; and configuring the tire monitoring device based on the configuration data.

20 Claims, 7 Drawing Sheets

(56) References Cited

U.S. PATENT DOCUMENTS

| | | | |
|---|---|---|---|
| 2008/0018448 A1 | 1/2008 | Ghabra et al. | |
| 2014/0188348 A1 | 7/2014 | Gautama | |
| 2016/0280019 A1 | 9/2016 | Yu et al. | |
| 2017/0316623 A1 | 11/2017 | Godet et al. | |
| 2019/0176545 A1* | 6/2019 | Riemann | B60C 23/0479 |
| 2019/0184772 A1 | 6/2019 | Bill et al. | |
| 2019/0275848 A1 | 9/2019 | Takeyama et al. | |

FOREIGN PATENT DOCUMENTS

| | | |
|---|---|---|
| CN | 108128104 | 6/2018 |
| CN | 108407556 | 8/2018 |
| EP | 2 910 393 | 8/2015 |
| EP | 3 284 619 | 2/2018 |
| JP | 2016/078488 | 5/2016 |
| KR | 20070031124 A | 3/2007 |
| WO | 2002007993 A2 | 1/2002 |
| WO | 2019/106828 | 6/2019 |

OTHER PUBLICATIONS

International Search Report and Written Opinion of the ISA for PCT/EP2020/066539, mailed Sep. 14, 2020, 10 pages.
Combined Search and Examination Report for GB1908626.3, dated Oct. 23, 2019, 10 pages.
Chinese Office Action cited in Application No. 202080006990.3 mailed Oct. 31, 2023, 8 pages.

* cited by examiner

TYRE MONITORING DEVICE CONFIGURATION

RELATED APPLICATIONS

This application is a continuation of U.S. application Ser. No. 17/418,107, filed Jun. 24, 2021, which is a U.S. national phase of International Application PCT/EP2020/066539, filed Jun. 16, 2020, which designated the U.S. and claims priority to United Kingdom Patent Application GB 1908626.3 filed Jun. 17, 2019, the entire contents of each of these applications are incorporated by reference.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but can still take time due to a requirement to travel from wheel to wheel measuring the pressures.

It would be desirable to provide a tyre pressure measurement system which addresses some, or all, of these points.

SUMMARY

According to a first example, there is provided a method of configuring a tyre monitoring device. The method comprises, at the tyre monitoring device: entering a configuration mode; responsive to entering the configuration mode, transmitting a first message to a second device, the message indicating that the second device should transmit configuration data to the tyre monitoring device; receiving configuration data from the second device in response to the first message; and configuring the tyre monitoring device based on the configuration data.

Optionally, the method further comprises transmitting a second message to the second device after receiving the configuration data, the second message indicating that the second device should stop sending configuration data.

Optionally, the second message comprises data indicating that the configuration data has been received.

Optionally, the second message comprises data indicating that the tyre monitoring device is no longer in a configuration mode.

Optionally, the entering a configuration mode is responsive to receipt of an instruction.

Optionally, the instruction is received from a third device which is separate device from the second device.

Optionally, the instruction is received using a different wireless communication protocol than is used for the configuration data.

Optionally, the configuration data comprises at least one of: a reference tyre pressure; a wheel position of the tyre monitoring device; a vehicle identifier; and compatibility data.

Optionally, the method further comprises disregarding any configuration data received after a predetermined time period has elapsed since the first message was sent.

According to another example, there is provided a tyre monitoring device comprising a processor configured to operate according to the method described above.

According to another example, there is provided a tyre monitoring system comprising: a tyre monitoring device comprising a wireless communication interface; a control device comprising a wireless communication interface; and a configuration device comprising a wireless communication interface. The tyre monitoring device comprises a processor configured to: enter a configuration mode in response to a command received from the configuration device over the wireless communication interface; and when in the configuration mode, receive configuration data over the wireless communication interface in response to a request for configuration data to at least one of the configuration device and the control device transmitted over the wireless communication interface.

Optionally, the tyre monitoring device is configured to reject received configuration data which is not in response to a request for configuration data.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth.

Reference in the specification to "an example" or similar language means that a particular feature, structure, or characteristic described in connection with the example is included in at least that one example, but not necessarily in other examples.

Certain methods and systems described herein relate to the operation of a sensor network in an aircraft, such as a network of tyre monitoring devices. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, a method of operating a tyre monitoring device is provided in which the tyre monitoring device controls the exchange of configuration data with another device. As the flow of configuration data is controlled by the tyre monitoring device itself, the security of the data transfer is improved; any third party device desiring to inject a malicious configuration device is limited to a short window in which the tyre monitoring device expects to receive configuration data.

According to further examples herein, a method of operating a tyre monitoring device is provided in which the tyre monitoring device compares compatibility data received with a command with compatibility data stored in the tyre monitoring device before executing the command. In this way compatibility between the tyre monitoring device and the command can be checked before execution. It is also possible, additionally or alternatively, to identify whether an update is required for either the tyre monitoring device or the device providing the command.

Example Tyre Monitoring System

Figure 1:
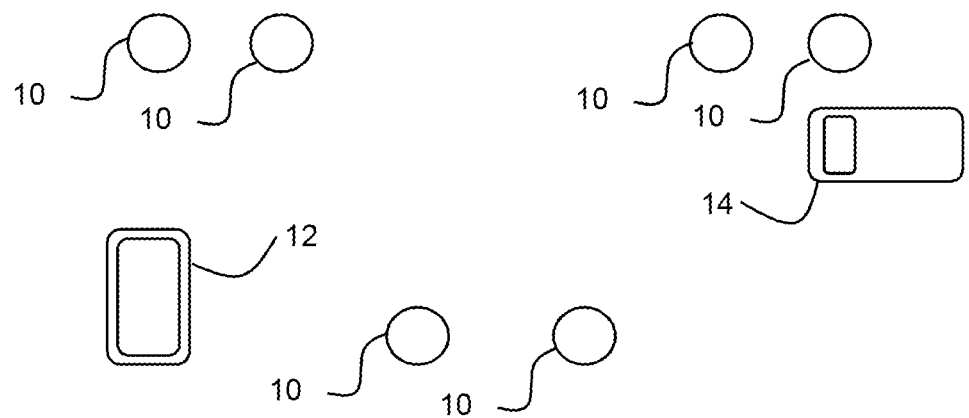
FIG. 1 shows a schematic representation of a tyre monitoring system according to a first example of the invention.

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
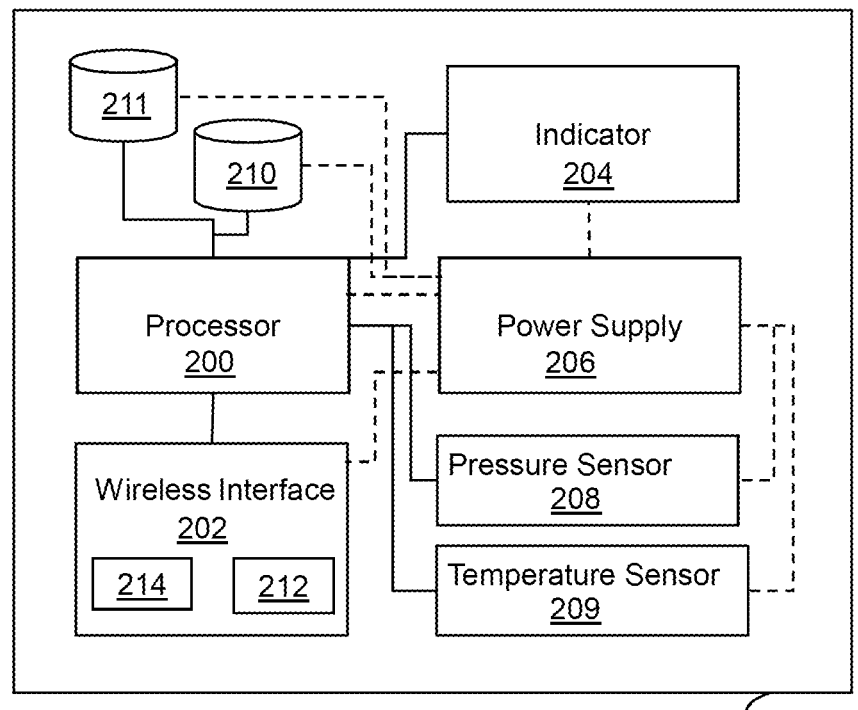
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
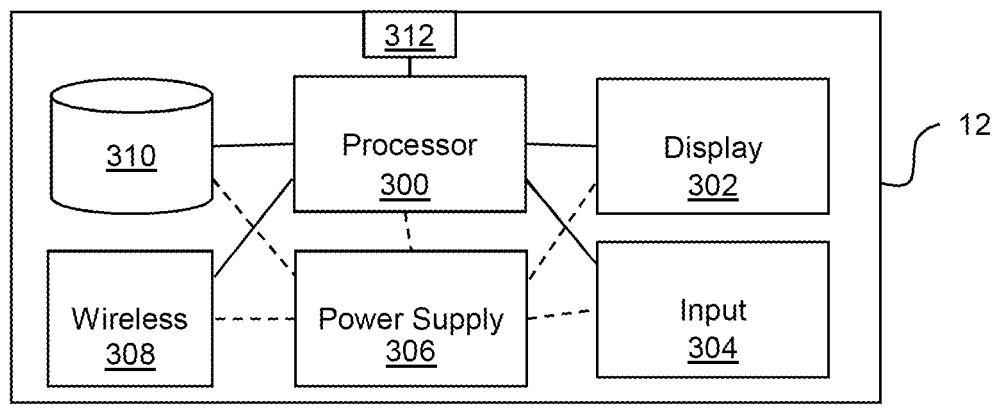
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
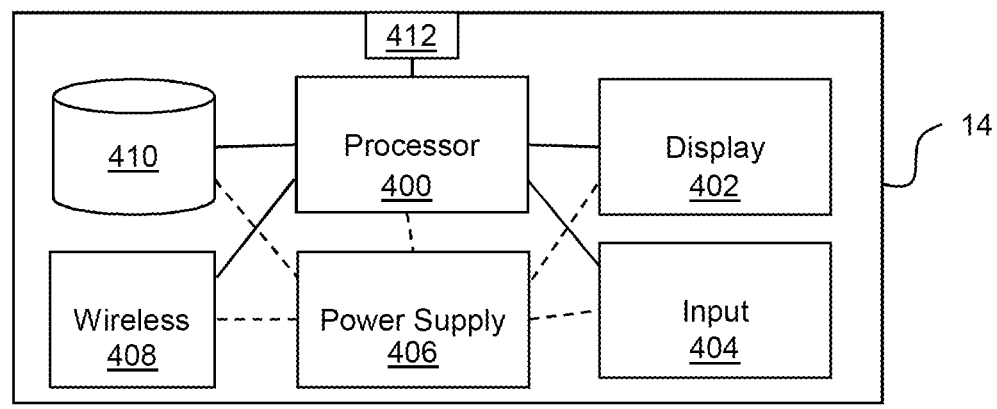
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
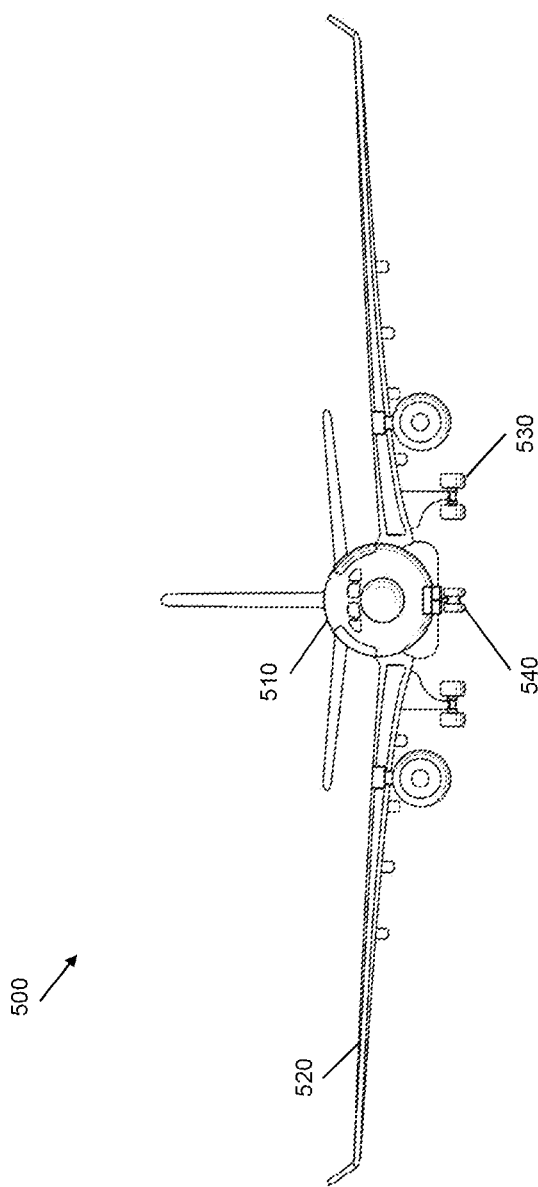
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
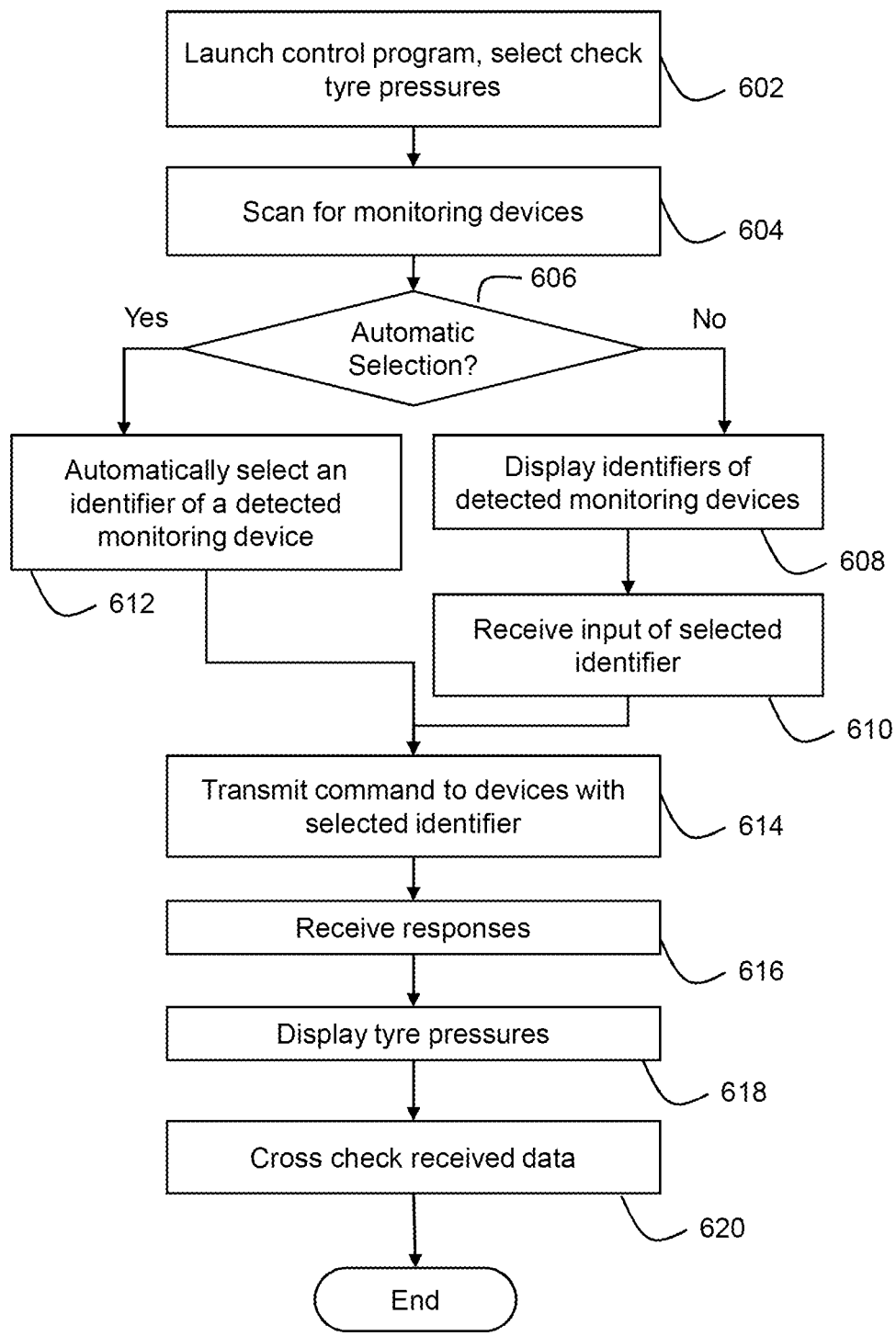
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 7:
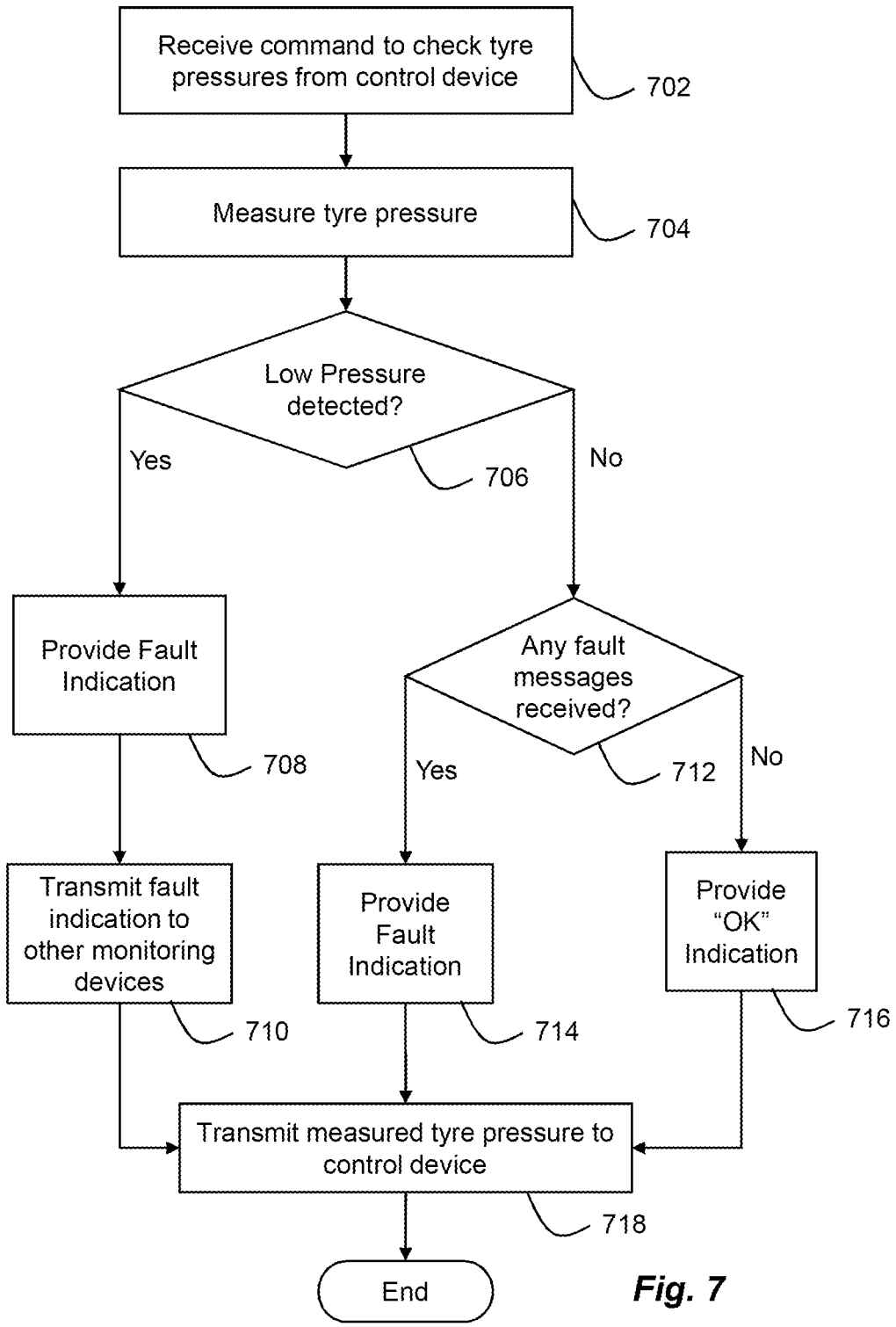
FIG. 7 shows a flow chart of tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Controlling the Flow of Configuration Instructions

Figure 8:
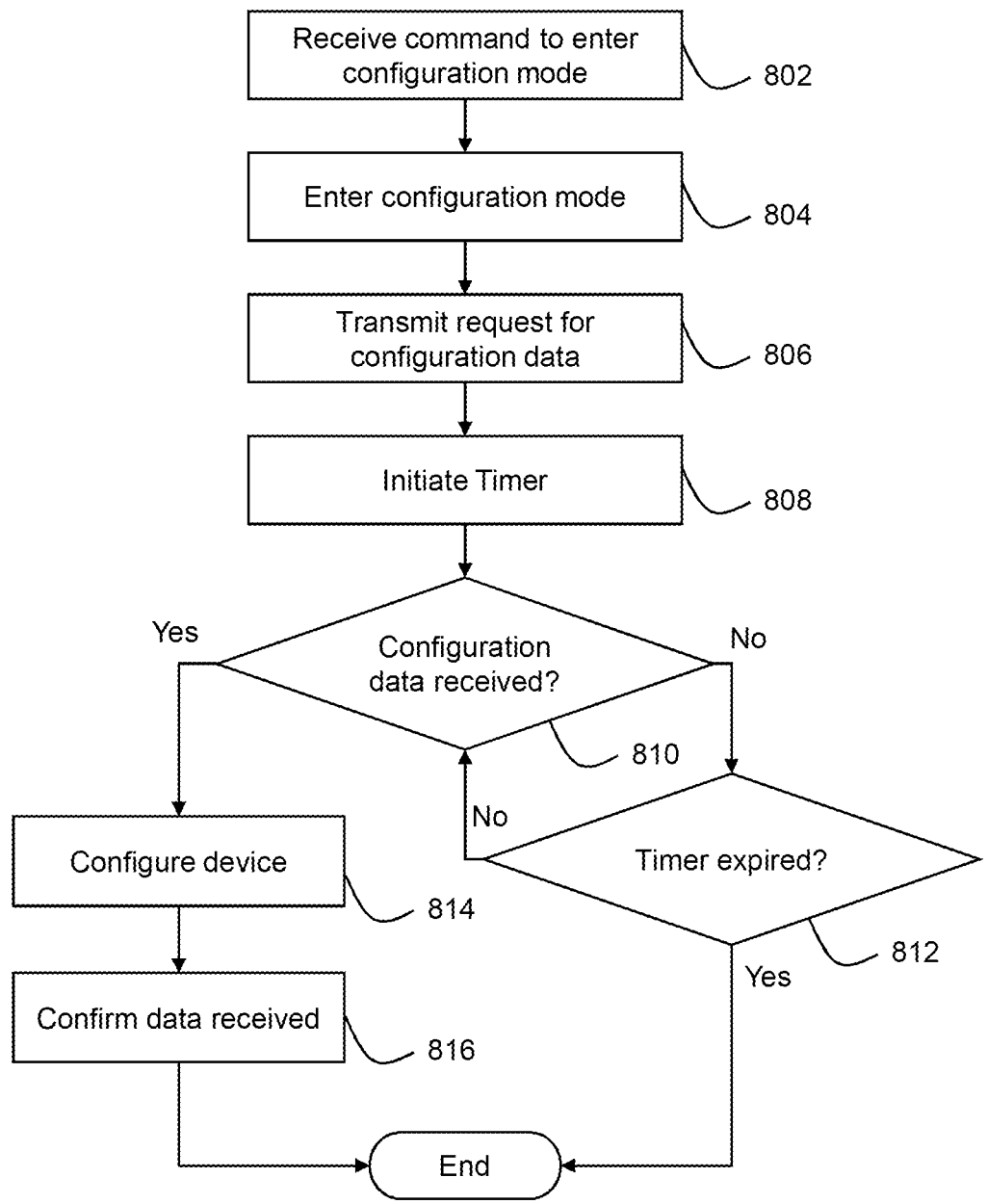
FIG. 8 shows a flow chart of a process by which a tyre monitoring device controls the flow of configuration data that can be used by the tyre monitoring device of FIG. 2.

Referring now to FIG. 8, a method of configuring a tyre monitoring device, such as the tyre monitoring device of FIG. 2, is disclosed. In this method, the tyre monitoring device itself controls the flow of configuration data. This provides increased security because the time window for a malicious device to inject incorrect configuration data is shorter.

The method begins at block 802, where the tyre monitoring device receives a command to enter the configuration mode. In this example, the command is received from the configuration device using a short range communication protocol, for example a protocol with a transmission range of 30 cm or less, using the relatively short range transceiver 214 described above with reference to FIG. 2. This limits the potential for the tyre monitoring device to enter the configuration mode because the command must be provided in close proximity, making a malicious or accidental reconfiguration less likely. In addition, the short range allows tyre monitoring devices affixed to adjacent wheels on the same axle to be distinguished because only one is in range of the configuration device. In other examples, the command to enter the configuration mode may be sent by another device, such as the control device. If the command to enter the configuration mode is sent by the control device, it may be sent over a short range communication protocol in the same way as for the configuration device. Alternatively a longer range communication protocol, such as one conforming to IEEE 802.11 or IEEE 802.15 standards may be used, although shorter ranges may provide more security.

In other examples, the command to enter the configuration mode can be provided in other ways, such as by pressing a button provided on the tyre monitoring device itself, although this may be less secure. The button may be physical button which moves to register an input or a capacitive or resistive button which in a change in capacitance or resistance is detected to register an input.

At block 804, the tyre monitoring device enters the configuration mode. Although entry into the configuration mode requires receipt of an external command, the configuration or reconfiguration in the remaining blocks of the method is controlled by the tyre monitoring device itself. Thus, at block 806, the tyre monitoring device transmits a request for configuration data to a second device. The request indicates that the second device should transmit configuration data to the tyre monitoring device. The second device can be either the control device of FIG. 3 or the configuration device of FIG. 4. Which particular second device is used may depend upon the particular circumstances, for example the control device may provide general configuration data such as reference tyre pressures, while the configuration device may provide more security sensitive data, such as encryption keys for communication with others of the tyre monitoring devices. In other examples all configuration data may be provided by the same device.

After having sent the request for configuration data, the tyre monitoring device awaits receipt of a response. In this example, a timer is initiated at block 808 which defines a timeout period after which the tyre configuration device will exit the configuration mode. The timer may be set for any suitable predetermined time, such as 0.5 seconds, 1 second, 5 seconds, 10 seconds, 20 seconds, 30 seconds or one minute depending on the trade-off between reliable receipt of the configuration data and minimizing the window for potential malicious or accidental reconfiguration.

At block 810, the tyre monitoring device checks to see if any configuration data has been received. If it has not, execution proceeds to block 812, otherwise, when data has been received, execution proceeds to block 814.

At block 812, no configuration data has yet been received. It is checked whether the timer initiated in block 808 has expired, if it has execution ends. Otherwise execution returns to block 810 to check whether configuration data has been received.

At block 814, the received configuration data is processed and used to configure the device. For example, the configuration data may comprise one or more of: a reference tyre pressure (a reference tyre pressure can be specified differently for different wheels, such as a different reference pressure for nose landing gear and main landing gear on a typical six-wheeled aircraft); a wheel position of the tyre monitoring device, such as a numerical or an alphanumeric identifier enabling the position of the wheel to be determined; a vehicle identifier, such as an aircraft tail identifier; and compatibility data, such as data indicating a software version for compatibility with the configuration data.

While the method of FIG. 8 illustrates a single request for configuration data in block 806 and a single response with configuration data which is processed in block 814, in other examples multiple requests and responses may take place. For example, the tyre monitoring device may request each item of configuration data separately, or may request different items of configuration data from different devices in multiple transactions or in a single transaction with each different device.

Once the tyre monitoring device is configured, the tyre monitoring device provides confirmation to the second device that the configuration data has been received in block 816. This may be, for example, an acknowledgement of the configuration data or a confirmation that the configuration mode has ended. Execution then ends.

Once execution of the method of FIG. 8 has ended, the tyre monitoring device may disregard, discard or take no action in response to any configuration data received. This can enhance security and guard against malicious or accidental reconfiguration because the tyre monitoring device cannot be reconfigured unless it is in the configuration mode.

The method of FIG. 8 enables a tyre monitoring system to operate with enhanced security against misconfiguration, either accidental or malicious. The tyre monitoring device may enter a configuration mode in response to a received command, but configuration data itself is only processed in response to a request sent by the time monitoring device after it has entered into the configuration mode. In this way the security is increased because the window for receipt of configuration data is small.

In some examples, the tyre monitoring device may reject configuration data which is not received in response to a request for configuration data sent by the tyre monitoring device itself, even when the tyre monitoring device is in the configuration mode. For example, configuration data may only be accepted from a device which was requested to provide configuration data and not from other devices. This may further enhance security.

Ensuring Compatibility Between Different Elements of a Tyre Monitoring System

A tyre monitoring system may comprise several devices of different types. For example, the tyre monitoring system of FIG. 1 comprises a plurality of tyre monitoring devices, a control device and a configuration device. All of these devices may be subject to different hardware and software update cycles. It can therefore be useful to ensure that all of the elements maintain compatibility. This can have particular benefits when several different control devices and/or configuration devices may be used with the system. While the tyre monitoring devices will generally remain in place on a single vehicle, so will move together as a system, different control devices and configuration devices may be used at different locations depending on movement of the vehicle. For example, the vehicle may not always be maintained at the same location and it can be useful to check compatibility as the different elements of the system change. In addition, it can be useful to ensure compatibility between devices and data and commands sent over the system for security purposes. Methods of ensuring this compatibility will now be discussed with reference to FIGS. 9 and 10.

Figure 9:
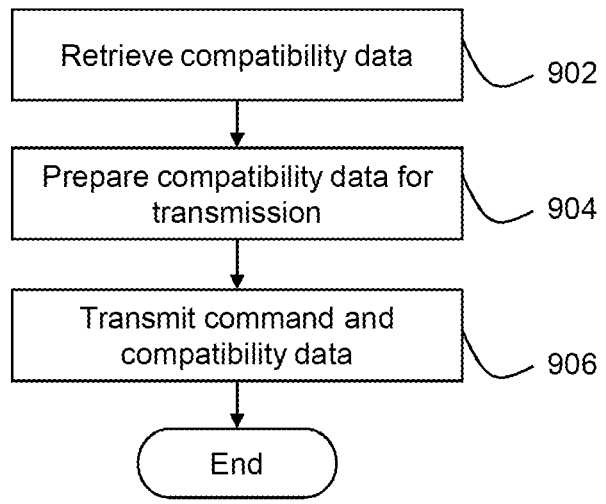
FIG. 9 shows a flow chart of a process to add compatibility data to a transmitted command that can be used by the control device of FIG. 3 or the configuration device of FIG. 4.

FIG. 9 shows a method for execution by a device transmitting a command or message to a tyre monitoring device, such as a configuration device of FIG. 4 or a control device of FIG. 3. According to the method of FIG. 9, the transmitting device adds compatibility data to a transmitted command, message or instruction. This compatibility data may indicate a software version of the device, or alternatively or additionally provide security benefits.

At block 902, the transmitting device retrieves compatibility data. For example, compatibility data may be stored in a storage of the device. The compatibility data may take several forms. In some examples it can be a value or data which is used as compatibility data for transmission without modification, such as one or more of: a software version of an application running on the device; a version of an instruction set, such as version of a particular command; an operating system version of the device; a hardware revision of the device; or a unique identifier of the device. In other examples, the compatibility data for transmission may change depending on the content of the command or message to be transmitted. For example, the retrieved compatibility data may be an encryption certificate or other form of encryption data such as pre-shared key, or an algorithm to produce a checksum which is processed to provide compatibility data for transmission.

Next, at block 904, the device prepares compatibility data for transmission. Depending on the nature of the compatibility data, this may involve simply associating the value of the data itself with a command for transmission, or may require more complicated steps. For example if the compatibility data is an algorithm to calculate a checksum, a checksum of the command may be determined and associated with the command. If the compatibility data is a digital certificate or some other form of encryption key, the compatibility data may be used to encrypt and/or digitally sign the command with that encryption or digital signature then forming the compatibility data that is transmitted. At block 906, the command is transmitted to the tyre monitoring device along with the compatibility data and the method ends.

Figure 10:
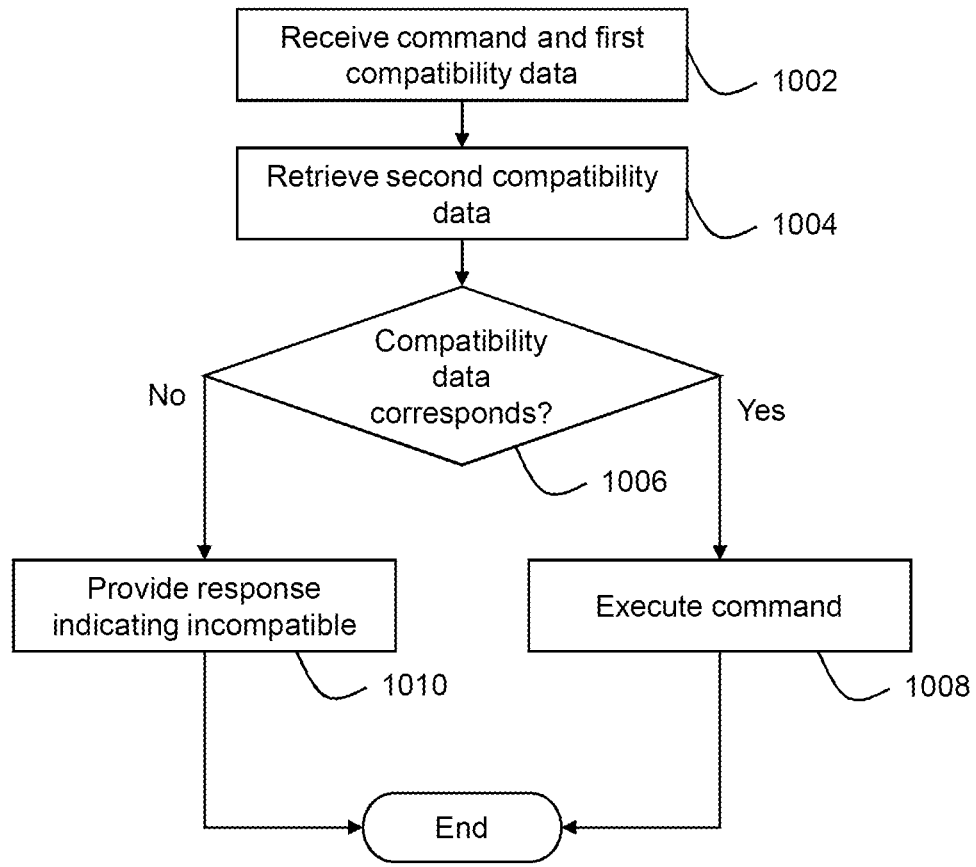
FIG. 10 shows a flow chart of a process in which compatibility data is checked before executing a command that can be used by the tyre monitoring device of FIG. 2.

At the tyre monitoring device, a method of processing commands and compatibility data sent according to the method of FIG. 9 is shown in FIG. 10. The method begins at block 1002 where the tyre monitoring device receives the command and first compatibility data. The first compatibility data is the data contained in the command or message received by the tyre monitoring device. Next, at block 1004, the tyre monitoring device retrieves second compatibility data. For example, the second compatibility data may be retrieved from a storage of the tyre monitoring device. The second compatibility data takes the same form as the compatibility data of the transmitting device, including all the options as discussed above with reference to block 902. For example, the compatibility data could be a value corresponding to one or more of a hardware revision, a software version, and an operating system version; an algorithm to calculate a checksum, or an encryption key or digital certificate. Encryption keys may be symmetric or non-symmetric. For example, the tyre monitoring device may hold a public key corresponding to a private key which is held on the transmitting device.

Next, at block 1006, it is determined whether the first compatibility data and the second compatibility data correspond to each other. This can be done in several ways.

Where the compatibility data is a value, the values can be compared and determined to correspond when they match or substantially match. For example, when the value comprises major and minor version numbers, the compatibility data may correspond when the major version numbers match.

Where the compatibility data is a checksum, the checksum may be calculated on the received command and verified to match the checksum received as the first compatibility data. In this case, the compatibility data may further allow an aspect of error checking in addition to ensuring compatibility.

Where the compatibility data comprises to encryption data, separate first compatibility data may be decrypted using the second compatibility data. Alternatively, an encrypted or signed command may be decrypted using the second compatibility data. Successful decryption or verification of the digital signature indicates that the compatibility data corresponds.

If it is determined that the compatibility data does correspond, then execution proceeds to block 1008. Otherwise, execution proceeds to block 1010.

At block 1008, the tyre monitoring device executes the command. For example, the command may be a command to measure tyre pressure according to FIG. 7 or a command to configure the device according to FIG. 8. Execution then ends.

At block 1010, when it has been determined that the compatibility data does not correspond, no action is taken to process or execute the command. In addition, a response indicating that the received compatibility data is incompatible is sent to the transmitting device. This may allow the transmitting device to identify that a software or firmware or hardware upgrade is required to ensure compatibility with the tyre monitoring device. For example, the response may include information of the compatibility data of the tyre monitoring device. In some examples, block 1010 may be omitted and the process may simply end without executing the command.

The methods of FIGS. 9 and 10 therefore provide a way both ensure compatibility and/or to enhance security. As elements of the tyre monitoring system are updated, they may be assigned new compatibility data. For example, a value may be incremented or otherwise altered, a checksum algorithm may be changed, an encryption algorithm may be changed or encryption keys may be changed. When the compatibility data comprises encryption keys, security may be enhanced because any third party seeking compatibility would also have to establish the encryption keys.

Although FIGS. 9 and 10 have been described from the perspective of the tyre monitoring device being a receiving device and a transmitting device being either a control device or a configuration device, the methods can equally be applied the other way round. For example a tyre monitoring device may add compatibility data to its responses to commands and/or messages received from a control device or configuration device. This may allow the receiving device to determine that the tyre monitoring device is incompatible, without requiring a specific message of incompatibility to be sent by the tyre monitoring device in response to a command. For example, the compatibility data may be sent in response to an initial probe from a control device to establish nearby tyre monitoring devices, so that the control device can identify incompatibility before any further commands or messages.

Further features of the invention are discussed below:

Feature 1. A method of operating a tyre monitoring device, the method comprising:
  receiving, from a control device over a wireless communication interface, a command and a first compatibility data;
  comparing, by the at least one tyre monitoring device, the first compatibility data and a second compatibility data stored in the at least one tyre monitoring device;
  executing, by the at least one tyre monitoring device, the command based on the comparing.

Feature 2. The method of feature 1, wherein the first compatibility data is associated with the command.

Feature 3. The method of feature 1, wherein the first compatibility data is associated with the control device.

Feature 4. The method of feature 1, 2 or 3, wherein the first compatibility data is associated with computer program instructions stored in the control device.

Feature 5. The method of any preceding feature, wherein the executing is dependent on the comparing indicating that the first compatibility data corresponds to the second compatibility data.

Feature 6. The method of any preceding feature, further comprising sending, to the control device, a response based on the comparing.

Feature 7. The method of feature 6, wherein the response is sent based on the comparing indicating that the first compatibility data and the second compatibility data are not compatible and the response comprises data representative of an incompatibility between the control device and the tyre monitoring device.

Feature 8. A tyre monitoring device comprising a wireless communication interface and a processor configured to execute the method of any preceding feature.

Feature 9. A method of operating a control device for a tyre monitoring system, the method comprising: preparing first compatibility data based on information stored in the control device; and transmitting a command to a tyre monitoring device based with the first compatibility data.

Feature 10. The method of feature 9, wherein the preparing the first compatibility data is further based on the command.

Feature 11. The method of feature 9 or 10, wherein the preparing the first compatibility data is further based on hardware of the control device.

Feature 12. The method of feature 9, 10, or 11, wherein the preparing the first compatibility data is based on computer program instructions stored in the control device.

Feature 13. The method of any of features 9 to 12, further comprising: receiving a response from the tyre monitoring device indicating that the tyre monitoring device is not compatible with the control device; and providing an indication of the incompatibility.

Feature 14. A control device for a tyre monitoring system comprising: a wireless communication interface; and a processor configured to execute the method of any of features 9 to 13.

Feature 15. A tyre monitoring system comprising: a plurality of tyre monitoring devices according to claim 8; and a control device according to claim 14.

Feature 16. A tyre monitoring system comprising: a control device comprising storage storing first compatibility data; and at least one tyre monitoring device comprising storage storing second compatibility data; wherein: the control device and the tyre monitoring device are configured to use the first and second compatibility data to determine whether commands from the control device should be executed by the at least one tyre monitoring device.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of operating a tire monitoring device, the method comprising:
  receiving, from a control device over a wireless communication interface, a command and a first compatibility data, wherein the first compatibility data is indicative of at least one of:
    a software version;
    an operating system version;
    a version of the command;
    a hardware revision;
    an encryption certificate;
    a pre-shared key;
    a digital certificate, or
    an algorithm to produce a checksum;
  comparing, by the at least one tire monitoring device, the first compatibility data and a second compatibility data corresponding to the first compatibility data, wherein the second compatibility data is stored in the at least one tire monitoring device; and executing, by the at least one tire monitoring device, the command based on the comparing.

2. The method of claim 1, wherein the first compatibility data is associated with the command.

3. The method of claim 1, wherein the first compatibility data is associated with the control device.

4. The method of claim 1, wherein the first compatibility data is associated with computer program instructions stored in the control device.

5. The method of claim 1, wherein the executing is dependent on the comparing indicating that the first compatibility data corresponds to the second compatibility data.

6. The method of claim 1, further comprising sending, to the control device, a response based on the comparing.

7. The method of claim 6, wherein the response is sent based on the comparing indicating that the first compatibility data and the second compatibility data are not compatible and the response comprises data representative of an incompatibility between the control device and the tire monitoring device.

8. A tire monitoring device comprising a wireless communication interface and a processor configured to execute a method comprising:

receiving, from a control device over the wireless communication interface, a command and a first compatibility data, wherein the first compatibility data is indicative of at least one of:

a software version;
an operating system version;
a version of the command;
a hardware revision;
an encryption certificate;
a pre-shared key;
a digital certificate, or
an algorithm to produce a checksum;

comparing, by the tire monitoring device, the first compatibility data and a second compatibility data corresponding to the first compatibility data, wherein the second compatibility data is stored in the tire monitoring device; and executing, by the tire monitoring device, the command based on the comparing.

9. The tire monitoring device of claim 8, wherein the first compatibility data is associated with the command.

10. The tire monitoring device of claim 8, wherein the first compatibility data is associated with the control device.

11. The tire monitoring device of claim 8, wherein the first compatibility data is associated with computer program instructions stored in the control device.

12. The tire monitoring device of claim 8, wherein the executing is dependent on the comparing indicating that the first compatibility data corresponds to the second compatibility data.

13. The tire monitoring device of claim 8, further comprising sending, to the control device, a response based on the comparing.

14. The tire monitoring device of claim 13, wherein the response is sent based on the comparing indicating that the first compatibility data and the second compatibility data are not compatible and the response comprises data representative of an incompatibility between the control device and the tire monitoring device.

15. A tire monitoring system comprising:

a control device comprising storage storing first compatibility data, wherein the first compatibility data is indicative of at least one of:

a software version;
an operating system version;
a version of the command;
a hardware revision;
an encryption certificate;
a pre-shared key;
a digital certificate, or
an algorithm to produce a checksum; and at least one tire monitoring device comprising storage storing second compatibility data, wherein the second compatibility data corresponds to the first compatibility data;

wherein the control device and the tire monitoring device are configured to use the first and second compatibility data to determine whether commands from the control device should be executed by the at least one tire monitoring device.

16. The tire monitoring system of claim 15, wherein the control device is configured to:

prepare the first compatibility data based on information stored in the control device; and transmit a command to the tire monitoring device based on the first compatibility data.

17. The tire monitoring system of claim 16, wherein the preparing the first compatibility data is further based on the command.

18. The tire monitoring system of claim 16, wherein the preparing the first compatibility data is further based on hardware of the control device.

19. The tire monitoring system of claim 16, wherein the preparing the first compatibility data is based on computer program instructions stored in the control device.

20. The tire monitoring system of claim 16, wherein the control device is further configured to:

receive a response from the tire monitoring device indicating that the tire monitoring device is not compatible with the control device; and provide an indication of the incompatibility.

* * * * *